(12) United States Patent
Ishida et al.

(10) Patent No.: US 9,529,144 B2
(45) Date of Patent: Dec. 27, 2016

(54) MULTICORE FIBER

(71) Applicant: FUJIKURA LTD., Tokyo (JP)

(72) Inventors: Itaru Ishida, Sakura (JP); Shoichiro Matsuo, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/633,306

(22) Filed: Feb. 27, 2015

(65) Prior Publication Data

US 2015/0323735 A1 Nov. 12, 2015

(30) Foreign Application Priority Data

May 7, 2014 (JP) .................................. 2014-095857

(51) Int. Cl.
G02B 6/036 (2006.01)
G02B 6/02 (2006.01)

(52) U.S. Cl.
CPC ............ *G02B 6/02* (2013.01); *G02B 6/02042* (2013.01)

(58) Field of Classification Search
CPC ................................................ G02B 6/02042
USPC ........................................................ 385/126
See application file for complete search history.

(56) References Cited

U.S. PATENT DOCUMENTS

| 8,406,595 | B2* | 3/2013 | Hayashi | G02B 6/02042 385/123 |
| 9,120,693 | B2* | 9/2015 | Hoover | C03B 37/0142 |
| 2003/0190130 | A1 | 10/2003 | Welker et al. | |
| 2011/0129190 | A1* | 6/2011 | Fini | G02B 6/02042 385/126 |
| 2011/0182557 | A1 | 7/2011 | Hayashi | |
| 2011/0188855 | A1 | 8/2011 | Kokubun et al. | |
| 2011/0222828 | A1* | 9/2011 | Sasaoka | G02B 6/02042 385/127 |
| 2011/0274398 | A1* | 11/2011 | Fini | G02B 6/0365 385/124 |
| 2011/0274435 | A1 | 11/2011 | Fini et al. | |

(Continued)

FOREIGN PATENT DOCUMENTS

| JP | 2008-242449 A | 10/2008 |
| JP | 2011-170336 A | 9/2011 |

(Continued)

OTHER PUBLICATIONS

"Novel multi-core fibers for mode division multiplexing: proposal and design principle" by Kokubun et al, IEICE Electronics Express, vol. 6, No. 8, pp. 522-528, 2009.*

(Continued)

*Primary Examiner* — Robert Tavlykaev
(74) *Attorney, Agent, or Firm* — Westerman, Hattori, Daniels & Adrian, LLP

(57) ABSTRACT

A multicore fiber according to the present invention includes a plurality of cores and a cladding enclosing the plurality of the cores. The plurality of the cores has two cores or greater forming a first plurality of cores linearly arranged to form a first row on one side based on a plane passed through the center axis of the cladding and three cores or greater forming a second plurality of cores arranged in parallel with the first plurality of the cores to form a second row on the other side based on the plane. The cores configuring the first plurality of the cores and the cores configuring the second plurality of the cores are disposed on lines orthogonal to the plane.

8 Claims, 8 Drawing Sheets

(56) References Cited

U.S. PATENT DOCUMENTS

| | | | |
|---|---|---|---|
| 2012/0114292 A1 | 5/2012 | Hoover et al. | |
| 2013/0223795 A1* | 8/2013 | Sasaoka | G02B 6/262 385/32 |
| 2014/0064687 A1* | 3/2014 | Hoover | G02B 6/03644 385/126 |
| 2014/0178024 A1 | 6/2014 | Takenaga et al. | |

FOREIGN PATENT DOCUMENTS

| | | |
|---|---|---|
| JP | 2011-193459 A | 9/2011 |
| JP | 2011-215556 A | 10/2011 |
| JP | 2013-54252 A | 3/2013 |
| JP | 5168702 B2 | 3/2013 |
| JP | 2014-500980 A | 1/2014 |

OTHER PUBLICATIONS

"Effects of intermodal dispersion on short pulse propagation in multi-mode fibers" by Liu et al, JETP Letters, vol. 95, No. 1, pp. 10-13, 2012.*

Office Action dated Mar. 8, 2016, issued in counterpart Japanese Patent Application No. 2014-095857, with English translation. (11 pages).

* cited by examiner

MULTICORE FIBER

BACKGROUND OF THE INVENTION

The present invention relates to a multicore fiber that is suitable for the case where a crosstalk between cores is decreased.

Presently, an optical fiber for use in optical fiber communication systems, which are generally popular, is in a structure in which one core is enclosed with a cladding, in which an optical signal is propagated through the inside of the core and information is transmitted.

In the optical fiber communication system in these years, a large number of from a few tens to a few hundreds of optical fibers are used, and the amount of information for transmission is dramatically increased. In order to decrease the number of optical fibers in such an optical fiber communication system, a multicore fiber is proposed in which a plurality of cores is enclosed with a cladding.

For example, a multicore fiber is proposed in Patent Document 1 below, in which a single core is disposed in the center of a cladding and six cores are disposed at positions to be the vertexes of a hexagon.

[Patent Document 1] JP-A-2011-193459

SUMMARY OF THE INVENTION

However, in the multicore fiber described in Patent Document 1 above, a single core disposed in the center of the cladding is surrounded by six cores on the circumferential side. Moreover, in the cores on the circumferential side, a single core disposed in the center of the cladding is adjacent to two cores adjacent in the circumferential direction with respect to the core. In this multicore fiber, since the center core is surrounded by the cores on the circumferential side, there is concern that the crosstalk between the cores is degraded.

On the other hand, in the multicore fiber described in Patent Document 1 above, when the core-to-core distance between the cores adjacent to each other is great, the crosstalk can be decreased. However, since the outer diameter of the multicore fiber is more increased as the core-to-core distance becomes longer, the multicore fiber is upsized.

Therefore, it is an object of the present invention to provide a multicore fiber that can decrease the crosstalk between cores while suppressing an increase in the outer diameter of the multicore fiber.

In order to solve the above-described object, the present invention includes a multicore fiber including: a plurality of cores; and a cladding enclosing the plurality of the cores, wherein the plurality of the cores has two cores or greater forming a first plurality of cores linearly arranged to form a first row on one side based on a plane passed trough a center axis of the cladding, and three cores or greater forming a second plurality of cores arranged in parallel with the first plurality of the cores to form a second row on other side based on the plane, and the cores configuring the first plurality of the cores and the cores configuring the second plurality of the cores are disposed on lines orthogonal to the plane.

In this multicore fiber, in the case where attention is focused on a single core among the plurality of the cores, even though attention is focused on any core among the plurality of the cores, the number of the cores adjacent to the core on which attention is focused is three at maximum. Therefore, the maximum value of the number of the cores adjacent to each other can be decreased, so that the crosstalk can be suppressed even though the core-to-core distance between the cores is decreased, as compared with a multicore fiber in which a single core disposed in the center of a cladding is disposed as the core is surrounded by a plurality of cores.

Thus, an increase in the outer diameter of the multicore fiber can also be suppressed because of a decrease in the core-to-core distance. Accordingly, in the multicore fiber according to the present invention, it is possible to decrease the crosstalk between the cores while suppressing an increase in the outer diameter of the multicore fiber.

Moreover, preferably, even though attention is focused on any core among the plurality of the cores, the plurality of the cores is disposed as the number of the cores adjacent to the core on which attention is focused at almost a same distance is two or less.

In the case where a plurality of cores is disposed as described above, in the core disposition in which the core-to-core distance between the cores adjacent to each other is almost the same, the cores are arranged in a row, and it is possible to further decrease the core-to-core distance, as compared with a multicore fiber in which a single core disposed in the center of a cladding is disposed as the core is surrounded by a plurality of cores.

Preferably, at least one core or greater among the plurality of the cores is enclosed with an inner cladding layer having a refractive index lower than a refractive index of the core, and the inner cladding layer is enclosed with a trench layer having a refractive index lower than the refractive index of the inner cladding layer and a refractive index of the cladding.

In the case of this configuration, a spread of the electric field distribution of light propagated through the core that is enclosed with the inner cladding layer and the trench layer can be suppressed, so that it is possible to decrease the crosstalk to the core.

Furthermore, preferably, the core that is enclosed with the inner cladding layer and the trench layer and the core that is not enclosed with the inner cladding layer or the trench layer are alternately disposed along a core disposition in which a core-to-core distance between the cores adjacent to each other is almost a same.

In the case of this configuration, it is possible that the containment of light in higher modes in the core is decreased and stretching the cutoff wavelength is suppressed, as compared with the case where all of a plurality of cores is enclosed with the inner cladding layer and the trench layer.

In addition, preferably, a core-to-core distance between the cores adjacent to each other on the line is greater than a core-to-core distance in the first plurality of the cores and a core-to-core distance in the second plurality of the cores.

In the case of this configuration, the core-to-core distance in the first plurality of the cores and the number of the cores adjacent to each other in the second plurality of the cores can be decreased, as compared with the case where the core-to-core distance between the cores adjacent to each other on a line is smaller than the core-to-core distance in the first plurality of the cores and the core-to-core distance in the second plurality of the cores, so that it is possible to further decrease the crosstalk.

It is noted that it may be fine that a core-to-core distance between the cores adjacent to each other on the line is smaller than a core-to-core distance in the first plurality of the cores and a core-to-core distance in the second plurality of the cores.

As described above, according to the present invention, there is provided a multicore fiber that can decrease the crosstalk between cores while suppressing an increase in the outer diameter of the multicore fiber.

DETAILED DESCRIPTION OF THE INVENTION

In the following, preferred embodiments of the present invention will be described in detail with reference to the drawings.

(1) First Embodiment

Figure 1:
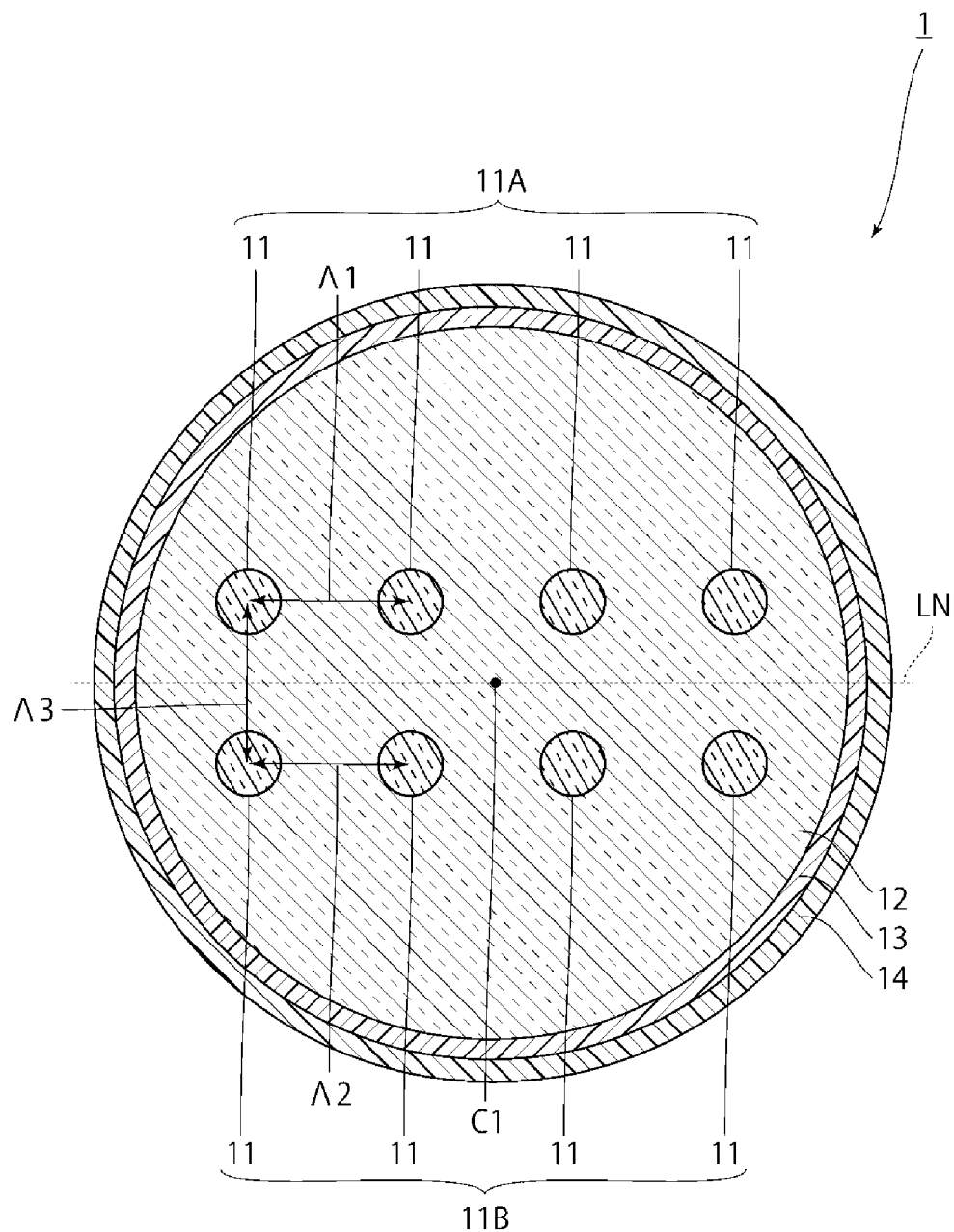
FIG. 1 is a diagram of a cross section perpendicular to the longer direction of a multicore fiber according to a first embodiment.

FIG. 1 is a diagram of a cross section perpendicular to the longer direction of a multicore fiber 1 according to a first embodiment. As illustrated in FIG. 1, a multicore fiber 1 according to the embodiment includes a plurality of cores 11, a cladding 12 that encloses the plurality of the cores 11, a first protective layer 13 that encloses the cladding 12, and a second protective layer 14 that encloses the first protective layer 13 as main components.

The plurality of the cores 11 includes a first plurality of cores 11A linearly arranged to form a first row on one side based on a plane LN passed through a center axis C1 of the cladding 12 and a second plurality of cores arranged in parallel with the first plurality of the cores 11A to form a second row on the other side based on the plane LN.

The first plurality of the cores 11A includes two cores or greater, and the second plurality of the cores 11B includes three cores or greater. In the embodiment, the first plurality of the cores 11A and the number of the second plurality of the cores 11B include four each.

The cores 11 configuring the first plurality of the cores 11A and the cores 11 configuring the second plurality of the cores 11B are disposed on lines orthogonal to the plane LN passed through the center axis C1 of the cladding 12.

A core-to-core distance Λ1 between the cores adjacent to each other among the first plurality of the cores 11A, a core-to-core distance Λ2 between the cores adjacent to each other among the second plurality of the cores 11B, and a core-to-core distance Λ3 between the first plurality of the cores 11A and the second plurality of the cores 11B are almost the same. It is noted that the core-to-core distance means a distance between the center axes of the cores 11 adjacent to each other.

In the case of the embodiment, the core-to-core distances Λ1 to Λ3 are shorter than the shortest distance between the outer circumferential surface of the outermost core of the cores 11 configuring the first plurality of the cores 11A and the outer circumferential surface of the cladding 12. The shortest distance is preferably 15 μm or greater and 62.5 μm or less, and more preferably 20 μm or greater and 35 μm or less.

It is noted that in FIG. 1, the center axes of the cores 11 configuring the first plurality of the cores 11A are located on a line in parallel with the plane LN passed through the center axis C1 of the cladding 12. However, it may be fine that the center axis of the core 11 is displaced from the linear line in parallel with the plane LN passed through the center axis C1 of the cladding 12 as long as the cores 11 configuring the first plurality of the cores 11A form a linearly arranged row.

The multicore fiber 1 described above includes the first plurality of the cores 11A linearly arranged on one side based on the plane LN passed through the center axis C1 of the cladding 12 and the second plurality of the cores 11B arranged in parallel with the first plurality of the cores 11A on the other side based on the plane LN.

In the multicore fiber 1, in the case where attention is focused on a single core 11 among the plurality of the cores 11, even though attention is focused on any core 11 among the plurality of the cores 11, the number of the cores 11 adjacent to the core 11 on which attention is focused is three at maximum.

Therefore, as compared with a multicore fiber in which a single core 11 disposed in the center of the cladding 12 is surrounded by a plurality of the cores 11, the maximum value of the number of the cores adjacent to each other can be decreased, so that the crosstalk can be suppressed even though the core-to-core distances Λ1 to Λ3 between the cores 11 are shortened. Thus, an increase in the outer diameter of the multicore fiber 1 can also be suppressed because of decreases in the core-to-core distances Λ1 to Λ3.

Moreover, the cores 11 configuring the first plurality of the cores 11A and the cores 11 configuring the second plurality of the cores 11B are disposed on lines orthogonal to the plane LN passed through the center axis C1 of the cladding 12. Thus, as compared with the case where the first plurality of the cores 11A and the second plurality of the cores 11B are not disposed on lines orthogonal to the plane LN passed through the center axis C1 of the cladding 12, the outer diameter of the multicore fiber 1 can be decreased in the direction in which the first plurality of the cores 11A and the second plurality of the cores 11B are arranged.

Therefore, in the multicore fiber 1 according to the embodiment, the crosstalk between the cores can be decreased while suppressing an increase in the outer diameter of the multicore fiber 1.

It is noted that preferably, among the cores 11 configuring the first plurality of the cores 11A, the difference in the cutoff wavelength between the outermost core 11 and the core 11 located adjacent to the outermost core 11 is 100 nm or less, and among the cores 11 configuring the second plurality of the cores 11B, the difference in the cutoff wavelength between the outermost core 11 and the core 11 located adjacent to the outermost core 11 is 100 nm or less.

Among the plurality of the cores 11 surrounded by the cladding 12, the cutoff wavelengths of the outermost cores 11 most easily fluctuate among the cores 11 configuring the first plurality of the cores 11A and the second plurality of the cores 11B. Thus, when the difference in the cutoff wavelength between the outermost core 11 and the core 11 located adjacent to the outermost core 11 is 100 nm or less, the difference in the cutoff wavelength between all the cores 11 adjacent to each other can be 100 nm or less. Therefore, it is possible to widen a communication wavelength range through which light can be propagated in a single mode.

(2) Second Embodiment

Next, a second embodiment will be described in detail with reference to the drawing. However, in components of a multicore fiber according to the second embodiment, the components the same as or equivalent to the components according to the first embodiment are designated the same reference numerals and signs, and the overlapping description will be appropriately omitted.

Figure 2:
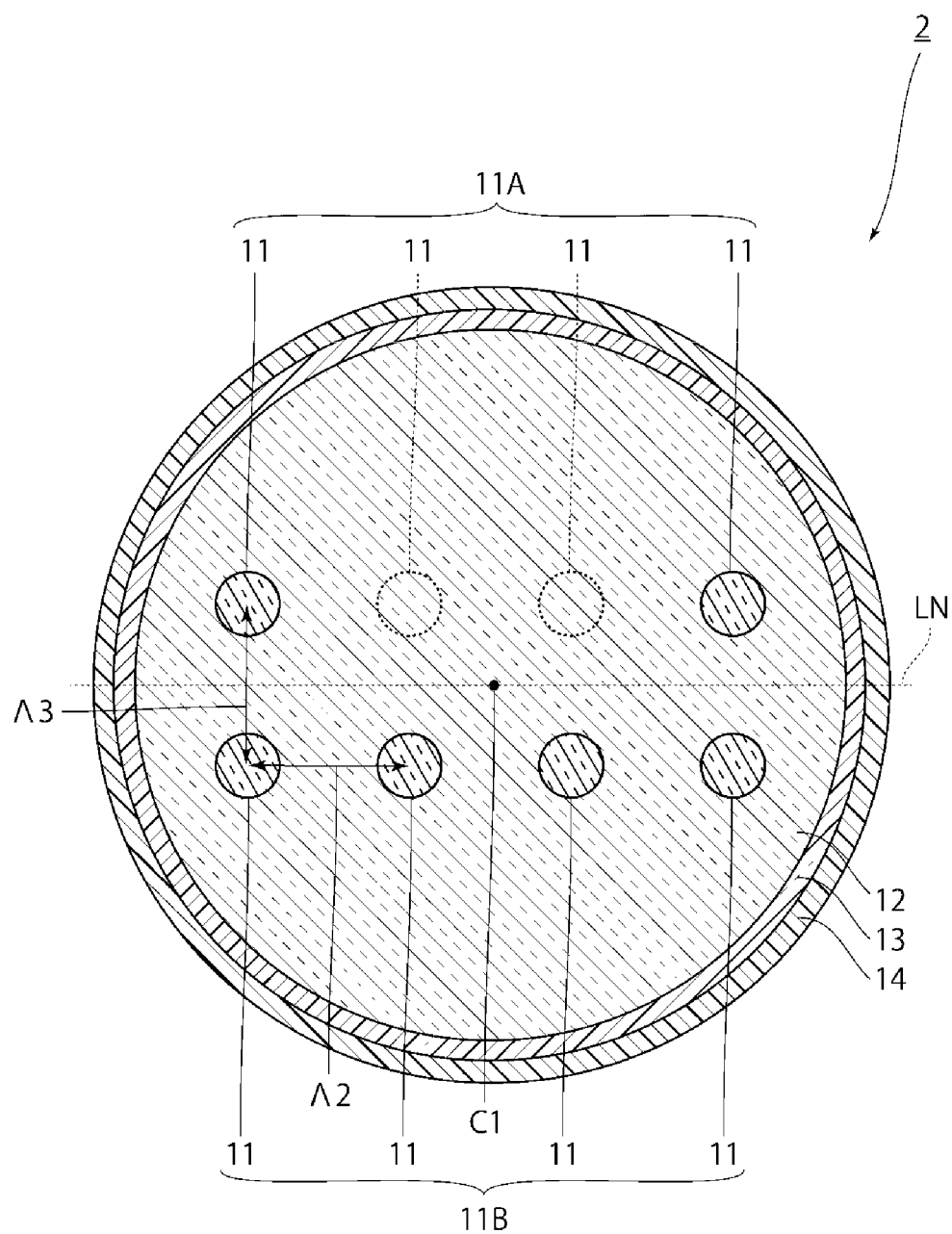
FIG. 2 is a diagram of a cross section perpendicular to the longer direction of a multicore fiber according to a second embodiment.

FIG. 2 is a diagram of a cross section perpendicular to the longer direction of a multicore fiber 2 according to the second embodiment. As illustrated in FIG. 2, in the multicore fiber 2 according to the embodiment, the disposition form of a first plurality of cores 11A is different from the multicore fiber 1 according to the first embodiment.

More specifically, in the multicore fiber 2 according to the embodiment, among the first plurality of four cores 11A, two cores 11 on the inner side pinched between a pair of core 11 located on the outside are omitted.

Thus, in the multicore fiber 2 according to the embodiment, even though attention is focused on any core 11 among the plurality of the cores 11, the number of the cores 11 adjacent to the core 11 on which attention is focused at almost the same distance is two or less. In the core disposition in which the core-to-core distances $\Lambda 2$ and $\Lambda 3$ between the cores 11 adjacent to each other are almost the same, the cores are arranged in a row.

As described above, in the multicore fiber 2 according to the embodiment, even though attention is focused on any core 11 among the plurality of the cores 11, the plurality of the cores 11 is disposed in such a manner that the number of the cores 11 adjacent to the core 11 on which attention is focused at almost the same distance is two or less.

Accordingly, it is possible to further decrease the crosstalk between the cores while suppressing an increase in the outer diameter of the multicore fiber 1, as compared with the case of the first embodiment.

(3) Third Embodiment

Next, a third embodiment will be described in detail with reference to the drawing. However, in components of a multicore fiber according to the third embodiment, the components the same as or equivalent to the components according to the first embodiment are designated the same reference numerals and signs, and the overlapping description will be appropriately omitted.

Figure 3:
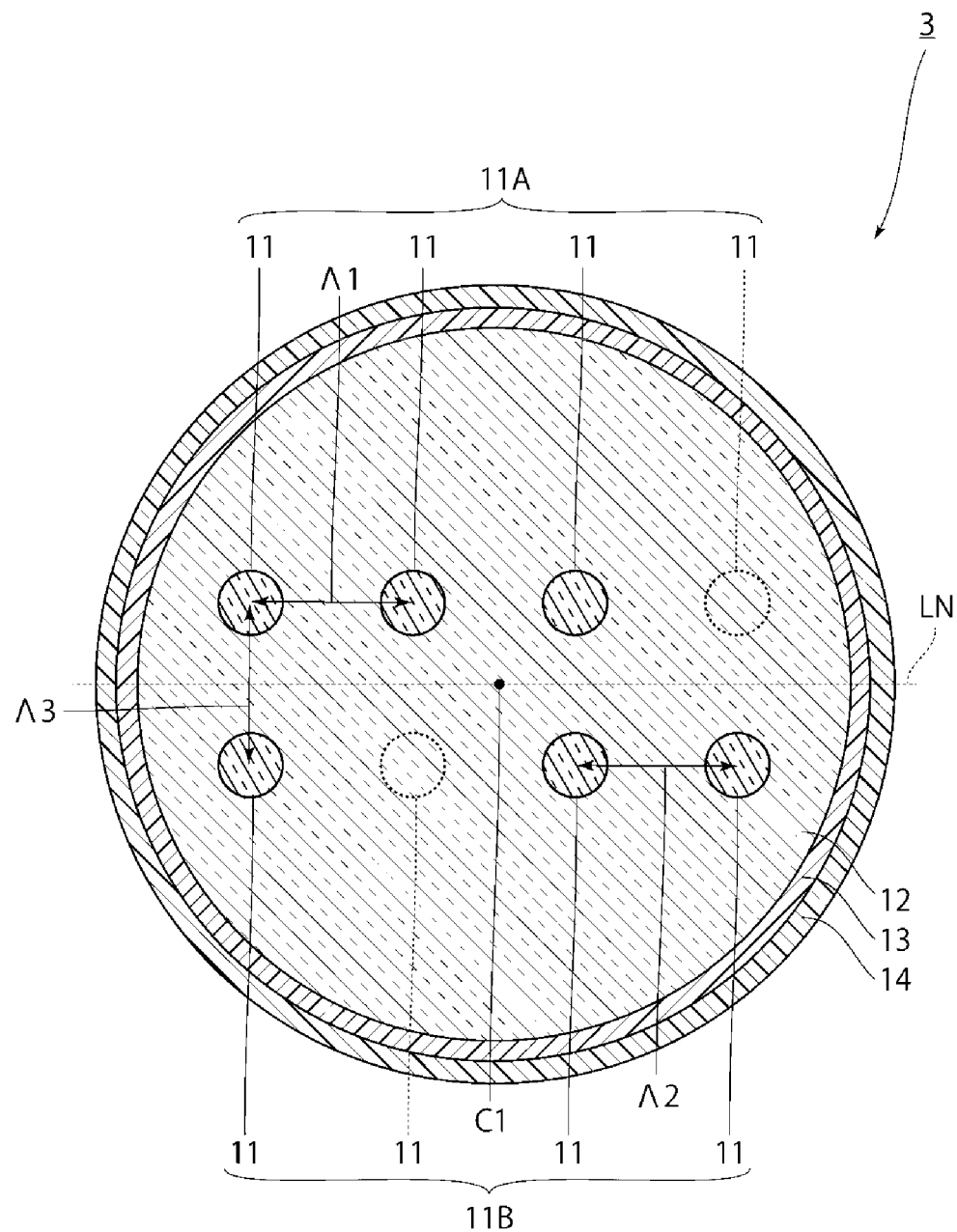
FIG. 3 is a diagram of a cross section perpendicular to the longer direction of a multicore fiber according to a third embodiment.

FIG. 3 is a diagram of a cross section perpendicular to the longer direction of a multicore fiber 3 according to the third embodiment. As illustrated in FIG. 3, in the multicore fiber 3 according to the embodiment, the disposition forms of a first plurality of cores 11A and a second plurality of cores 11B are different from the multicore fiber 1 according to the first embodiment.

More specifically, in the multicore fiber 3 according to the embodiment, in the case where one of a pair of cores 11 located on the outermost side is positioned on the leftmost side and the other core 11 is positioned on the rightmost side among the first plurality of the cores 11A, the core 11 on the fourth left side is omitted among the first plurality of the cores 11A. Moreover, in this case, the core 11 on the second left side is omitted among the second plurality of the cores 11B.

Thus, in the multicore fiber 3 according to the embodiment, similar to the second embodiment, in the core disposition in which the core-to-core distances $\Lambda 1$ to $\Lambda 3$ between the cores 11 adjacent to each other are almost the same, the cores are arranged in a row.

As described above, in the multicore fiber 3 according to the embodiment, similar to the second embodiment, even though attention is focused on any core 11 among the plurality of the cores 11, the plurality of the cores 11 is disposed in such a manner that the number of the cores 11 adjacent to the core 11 on which attention is focused at almost the same distance is two or less.

Therefore, similar to the second embodiment, it is possible to further decrease the crosstalk between the cores while suppressing an increase in the outer diameter of the multicore fiber 1, as compared with the case of the first embodiment.

Moreover, in the core disposition in which the core-to-core distances $\Lambda 1$ to $\Lambda 3$ between the cores 11 adjacent to each other are almost the same, the cores 11 are arranged in asymmetry. Therefore, when the multicore fiber 3 is observed from the end portion, a specific core 11 can be intuitively identified without disposing an identification marker in the cladding 12.

(4) Fourth Embodiment

Next, a fourth embodiment will be described in detail with reference to the drawing. However, in components of a multicore fiber according to the fourth embodiment, the components the same as or equivalent to the components according to the first embodiment are designated the same reference numerals and signs, and the overlapping description will be appropriately omitted.

Figure 4:
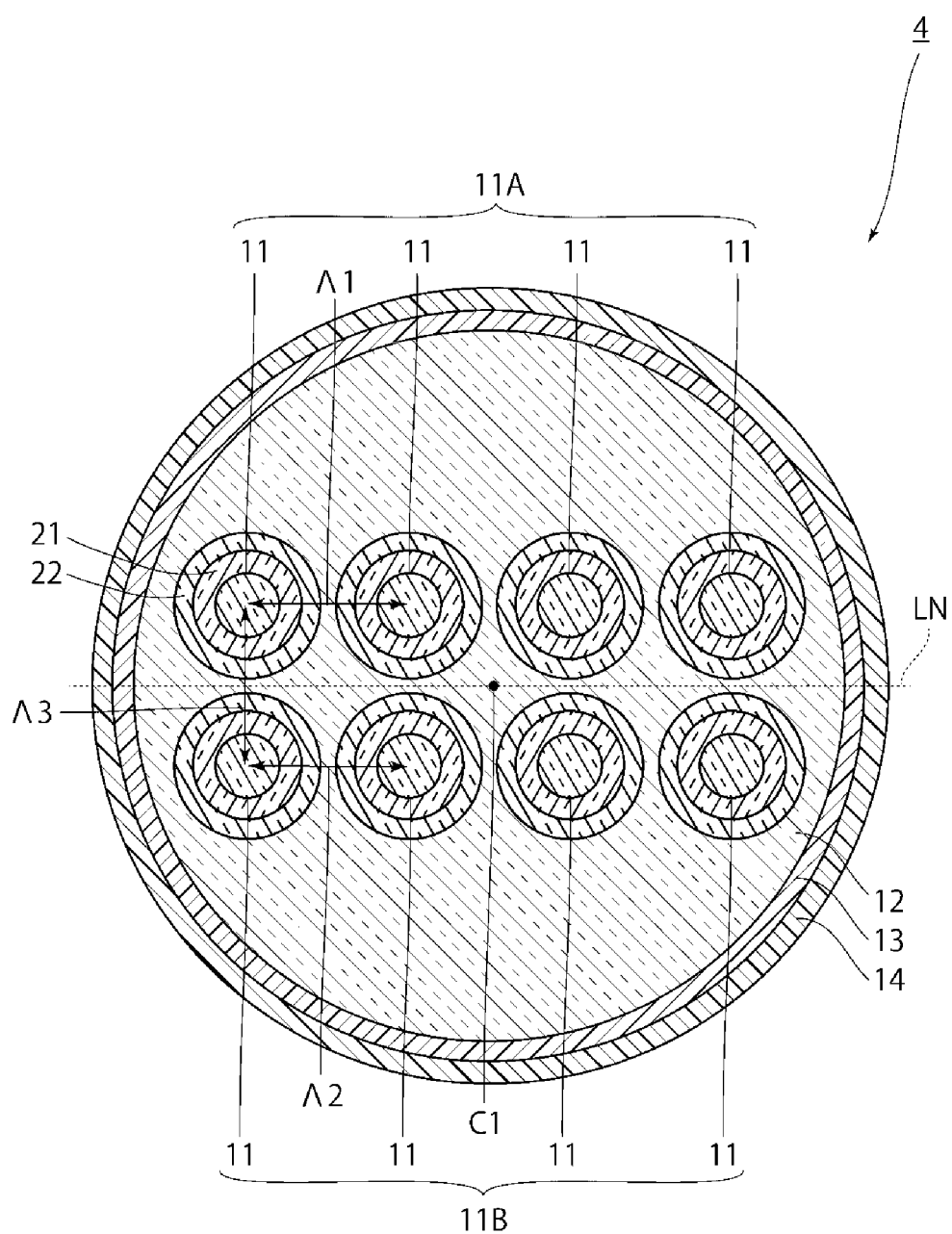
FIG. 4 is a diagram of a cross section perpendicular to the longer direction of a multicore fiber according to a fourth embodiment.

FIG. 4 is a diagram of a cross section perpendicular to the longer direction of a multicore fiber 4 according to the fourth embodiment. As illustrated in FIG. 4, the multicore fiber 4 according to the embodiment is different from the multicore fiber 1 according to the first embodiment in that an inner cladding layer 21 that encloses a core 11 and a trench layer 22 that encloses the inner cladding layer 21 are newly provided.

Figure 5:
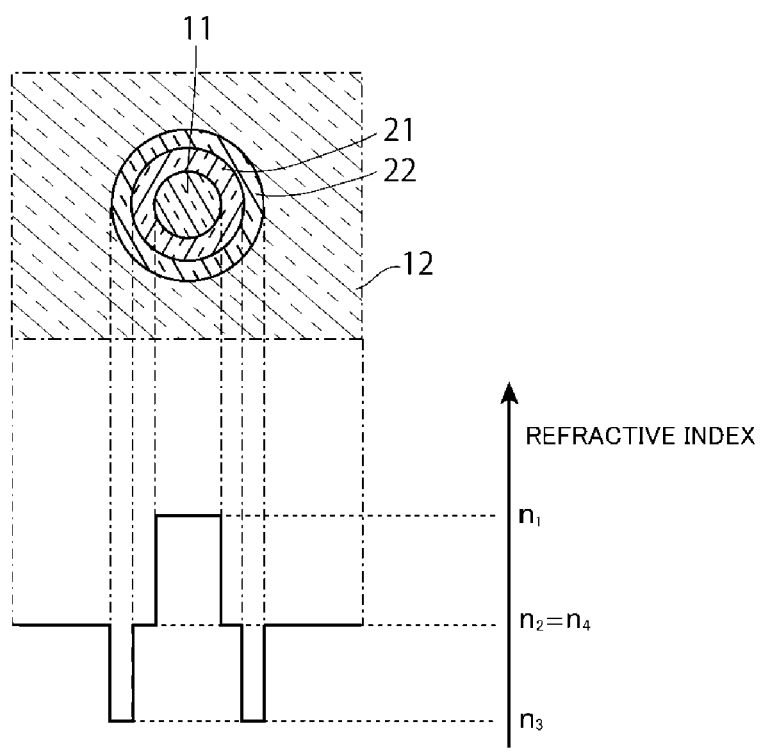
FIG. 5 is a diagram of a refractive index profile in a cladding.

FIG. 5 is a diagram of a refractive index profile in a cladding 12. As illustrated in FIG. 5, the core 11 is enclosed with the inner cladding layer 21 having a low refractive index $n_2$ lower than a refractive index $n_1$ of the core 11. The inner cladding layer 21 is enclosed with the trench layer 22 having a refractive index $n_3$ lower than the refractive index $n_2$ of the inner cladding layer 21 and a refractive index $n_4$ of the cladding 12.

For example, the core 11 is formed of silica doped with a dopant that increases a refractive index such as germanium, and the cladding 12 is formed of pure silica. Moreover, the inner cladding layer 21 is formed of silica doped with a dopant in an amount smaller than the amount of the dopant to the core 11, and the trench layer 22 is formed of silica doped with a dopant that decreases a refractive index such as fluorine.

It is noted that in FIG. 5, the refractive index $n_2$ of the inner cladding layer 21 is almost the same as the refractive index $n_4$ of the cladding 12. However, it may be fine that the refractive index $n_2$ of the inner cladding layer 21 is higher or lower than the refractive index $n_4$ of the cladding 12.

According to the multicore fiber 4, a spread of the electric field distribution of light propagated through the cores 11 can be suppressed, so that the crosstalk between the cores can be decreased.

(5) Fifth Embodiment

Next, a fifth embodiment will be described in detail with reference to the drawing. However, in components of a multicore fiber according to the fifth embodiment, the components the same as or equivalent to the components according to the first embodiment are designated the same reference numerals and signs, and the overlapping description will be appropriately omitted.

Figure 6:
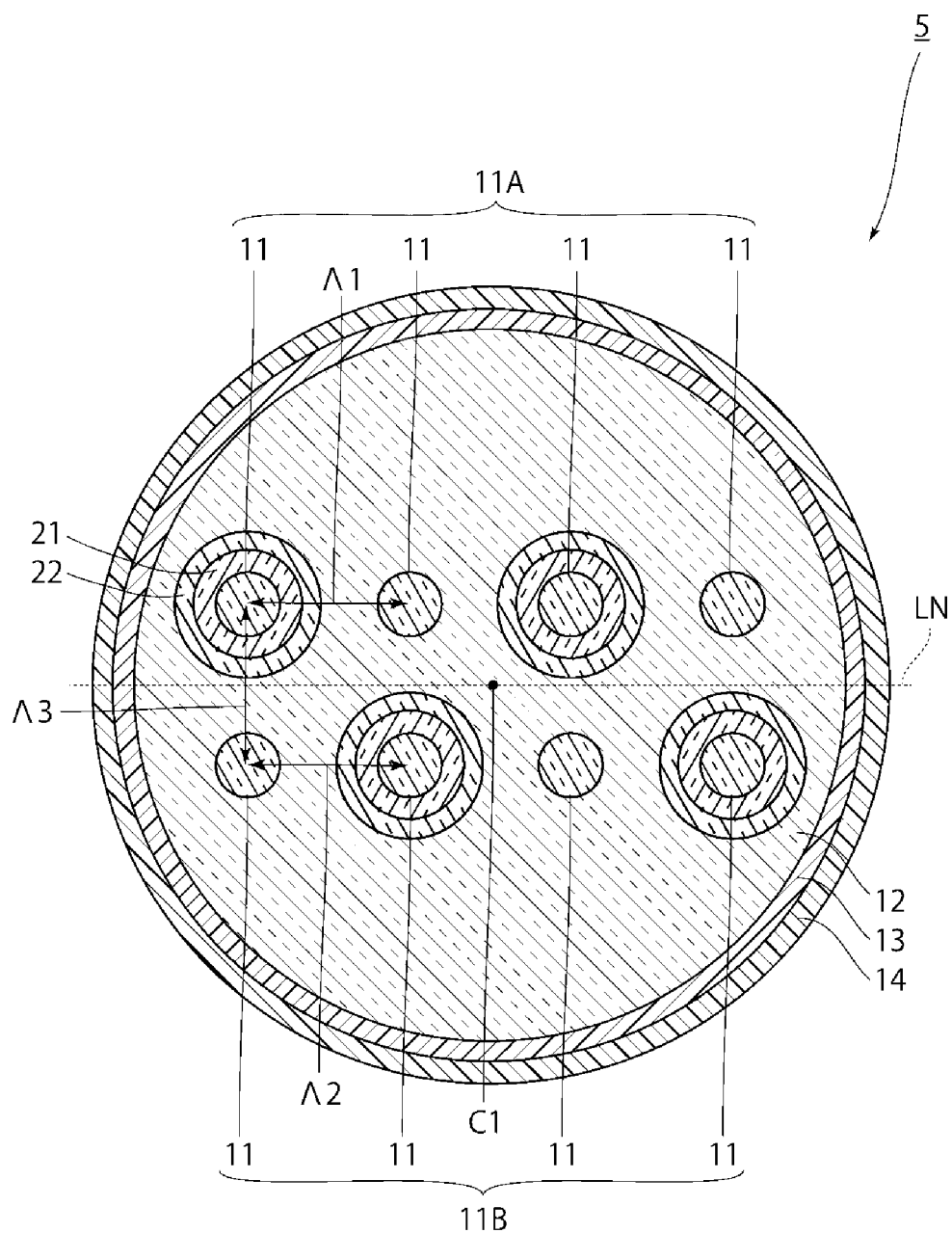
FIG. 6 is a diagram of a cross section perpendicular to the longer direction of a multicore fiber according to a fifth embodiment.

FIG. 6 is a diagram of a cross section perpendicular to the longer direction of a multicore fiber 5 according to the fifth embodiment. As illustrated in FIG. 6, the multicore fiber 5 according to the embodiment is different from the multicore fiber 1 according to the first embodiment in that an inner cladding layer 21 and a trench layer 22 are omitted from a part of cores 11.

More specifically, in a first plurality of cores 11A, a core 11 that is enclosed with the inner cladding layer 21 and the trench layer 22 and a core 11 that is not enclosed with the inner cladding layer 21 or the trench layer 22 are alternately disposed. Moreover, in a second plurality of cores 11B, a core 11 that is enclosed with the inner cladding layer 21 and the trench layer 22 and a core 11 that is not enclosed with the inner cladding layer 21 or the trench layer 22 are alternately disposed.

Furthermore, in the direction orthogonal to the direction in which the first plurality of the cores 11A and the second plurality of the cores 11B are arranged, one of the cores 11 adjacent to each other is enclosed with the inner cladding layer 21 and the trench layer 22, and the other of the cores 11 adjacent to each other is not enclosed with the inner cladding layer 21 or the trench layer 22.

As described above, in the multicore fiber 5, the core 11 that is enclosed with the inner cladding layer 21 and the trench layer 22 and the core 11 that is not enclosed with the inner cladding layer 21 or the trench layer 22 are alternately disposed along the core disposition in which the core-to-core distances $\Lambda 1$ to $\Lambda 3$ between the cores 11 adjacent to each other are almost the same.

Therefore, as compared with the case where all of the plurality of the cores 11 is enclosed with the inner cladding layer 21 and the trench layer 22 in the fourth embodiment, it is possible that the containment of light in higher modes in the core 11 is decreased and stretching the cutoff wavelength is suppressed.

(6) Sixth Embodiment

Next, a sixth embodiment will be described in detail with reference to the drawing. However, in components of a multicore fiber according to the sixth embodiment, the components the same as or equivalent to the components according to the first embodiment are designated the same reference numerals and signs, and the overlapping description will be appropriately omitted.

Figure 7:
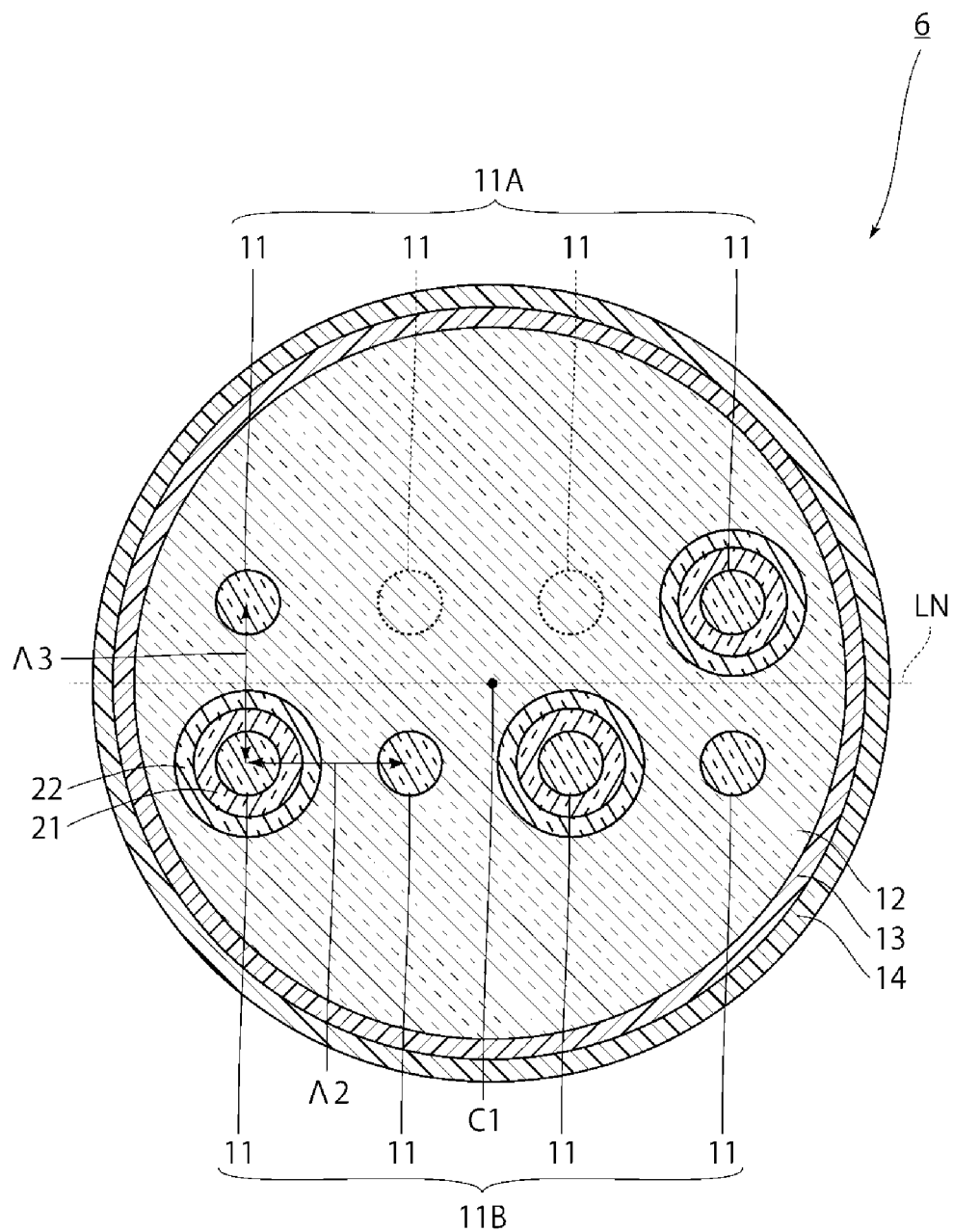
FIG. 7 is a diagram of a cross section perpendicular to the longer direction of a multicore fiber according to a sixth embodiment.

FIG. 7 is a diagram of a cross section perpendicular to the longer direction of a multicore fiber 6 according to the sixth embodiment. As illustrated in FIG. 7, the multicore fiber 6 acceding to the embodiment is different from the multicore fiber 2 according to the second embodiment in that an inner cladding layer 21 and a trench layer 22 are provided on a part of cores 11.

More specifically, the core 11 that is enclosed with the inner cladding layer 21 and the trench layer 22 and the core 11 that is not enclosed with the inner cladding layer 21 or the trench layer 22 are alternately disposed along the core disposition in which the core-to-core distances $\Lambda 2$ and $\Lambda 3$ between the cores 11 adjacent to each other are almost the same.

According to the multicore fiber 6, both of the effect described in the second embodiment and the effect described in the fifth embodiment can be obtained. In other words, in addition to the fact that the crosstalk between the cores is decreased while suppressing an increase in the outer diameter of the multicore fiber 1, it is possible that the containment of light in higher modes in the core 11 is decreased and stretching the cutoff wavelength is suppressed.

(7) Seventh Embodiment

Next, a seventh embodiment will be described in detail with reference to the drawing. However, in components of a multicore fiber according to the seventh embodiment, the components the same as or equivalent to the components according to the first embodiment are designated the same reference numerals and signs, and the overlapping description will be appropriately omitted.

Figure 8:
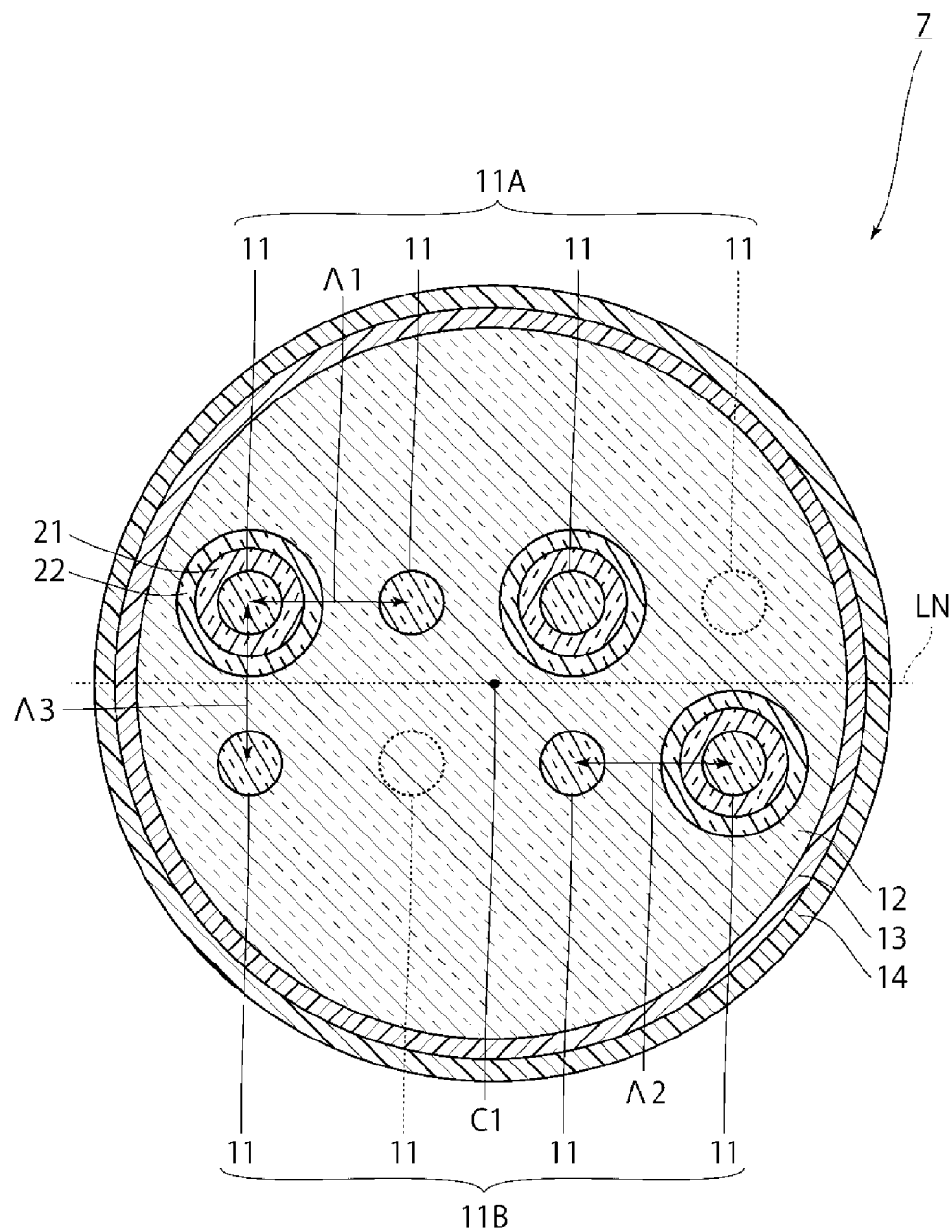
FIG. 8 is a diagram of a cross section perpendicular to the longer direction of a multicore fiber according to a seventh embodiment.

FIG. 8 is a diagram of a cross section perpendicular to the longer direction of a multicore fiber 7 according to the seventh embodiment. As illustrated in FIG. 8, the multicore fiber 7 according to the embodiment is different from the multicore fiber 3 according to the third embodiment in that an inner cladding layer 21 and a trench layer 22 are provided on a part of cores 11.

More specifically, the core 11 that is enclosed with the inner cladding layer 21 and the trench layer 22 and the core 11 that is not enclosed with the inner cladding layer 21 or the trench layer 22 are alternately disposed along the core disposition in which the core-to-core distances $\Lambda 1$ to $\Lambda 3$ between the cores 11 adjacent to each other are almost the same.

According to the multicore fiber 7, both of the effect described in the third embodiment and the effect described in the fifth embodiment can be obtained. In other words, in addition to the fact that the crosstalk between the cores is decreased while suppressing an increase in the outer diameter of the multicore fiber 1, it is possible that the containment of light in higher modes in the core 11 is decreased and stretching the cutoff wavelength is suppressed.

Moreover, in the core disposition in which the core-to-core distances $\Lambda 1$ to $\Lambda 3$ between the cores 11 adjacent to each other are almost the same, the cores 11 are arranged in asymmetry. Therefore, when the multicore fiber 3 is observed from the end portion, a specific core 11 can be intuitively identified without disposing an identification marker in the cladding 12.

(8) Exemplary Modifications

In the embodiments, the number of the cores in the first plurality of the cores 11A is two, three, or four. However, various numbers can be taken as long as the number of the cores in the first plurality of the cores 11A is two or greater.

In the embodiments, the number of the cores in the second plurality of the cores 11B is three or four. However, various numbers can be taken as long as the number of the cores in the second plurality of the cores 11B is three or greater.

In the embodiments, the core-to-core distance $\Lambda 1$ between the cores 11 adjacent to each other in the first plurality of the cores 11A, the core-to-core distance Λ2 between the cores 11 adjacent to each other in the second plurality of the cores 11B, and the core-to-core distance Λ3 between the first plurality of the cores 11A and the second plurality of the cores 11B are almost the same. However, it may be fine that the core-to-core distance Λ3 is greater or smaller than the core-to-core distance Λ1 and the core-to-core distance Λ2. In the case where the core-to-core distance Λ3 is greater than the core-to-core distance Λ1 and the core-to-core distance Λ2, the number of the cores adjacent to each other in the first plurality of the cores 11A and in the second plurality of the cores 11B can be decreased, and the crosstalk can be further decreased, as compared with the case where the core-to-core distance Λ3 is smaller than the core-to-core distance Λ1 and the core-to-core distance Λ2. It is noted that it may be fine that the core-to-core distance Λ3 is smaller than the core-to-core distance Λ1 and the core-to-core distance Λ2.

In the embodiments, the cross sectional form of the cladding 12 is in a circular shape in the multicore fibers 1 to 7. However, it may be fine that the cross sectional form of the cladding 12 is in an elliptic shape. In the case where the cross sectional form of the cladding 12 is in an elliptic shape, the first plurality of the cores 11A is disposed on one side based on a plane passed through the center axis C1 of the cladding 12 along the major axis, and the second plurality of the cores 11B is disposed on the other side based on the plane.

Examples

The multicore fiber according to the first embodiment was experimentally produced as a first example, the multicore fiber according to the second embodiment was experimentally produced as a second example, and the multicore fiber according to the third embodiment was experimentally produced as a third example.

In these multicore fibers, the relative refractive index difference of the core 11 to the cladding 12 was 0.8%, the diameter of the core 11 was 6 μm, the core-to-core distances Λ1 to Λ3 were 28 μm, the outer diameter of the cladding 12 was 125 μm, and the length of the multicore fiber was 1,000 m.

In the state in which a light beam at a wavelength of 1,550 nm was incident on the cores of the multicore fibers, the crosstalk between the cores was measured. The crosstalk was −20 dB in the first example, and the crosstalk was −22 dB in the second example and the third example. It is noted that the values of the crosstalk were the best values among numeric values measured for all the cores.

On the other hand, as a comparative example, a multicore fiber was experimentally produced in which a single core was disposed in the center of a cladding, six cores were disposed at positions to be the vertexes of a hexagon having the single core at a geometric center, and the cores were enclosed with the cladding.

In this multicore fiber, the relative refractive index difference of the core to the cladding was 0.8%, the diameter of the core was 6 μm, the core-to-core distance was 28 μm, the outer diameter of the cladding was 125 μm, and the length of the multicore fiber was 1,000 m.

In the state in which a light beam at a wavelength of 1,550 nm was incident on the cores of the multicore fibers, the crosstalk in the center of the core was measured. The crosstalk was 17 dB.

As described above, in the first example to the third example according to the present invention, the crosstalk between the cores was more excellent than that in the comparative example.

The multicore fiber according to the present invention can be appropriately combined, omitted, modified, and additionally provided with known techniques other than the description above within the scope not deviating from the object of the present application.

The invention claimed is:

1. A multicore fiber comprising:
a plurality of cores; and
a cladding enclosing the plurality of the cores, wherein the plurality of the cores has
two cores or greater forming a first plurality of cores linearly arranged to form a first row on one side based on a plane passed through a center axis of the cladding, and
three cores or greater forming a second plurality of cores arranged in parallel with the first plurality of the cores to form a second row on other side based on the plane, and
one of the cores configuring the first plurality of the cores and one of the cores configuring the second plurality of the cores are disposed on a line orthogonal to the plane,
wherein all of the first plurality of cores and the second plurality of cores have substantially a same relative refractive index difference to the cladding,
wherein the number of cores adjacent to any given core at an almost same distance is not more than two,
wherein a first core-to-core distance between a first pair of adjacent cores in the first row is different from a second core-to-core distance between a second pair of adjacent cores in the second row,
wherein all of the first plurality of cores and the second plurality of cores are separated and optically uncoupled from one another,
wherein an $n^{th}$ core from one end side in the first row is not aligned with an $n^{th}$ core from the same end side in the second row on a line orthogonal to the plane, wherein n is an integer greater than zero.

2. The multicore fiber according to claim 1, wherein at least one core among the plurality of the cores is enclosed with an inner cladding layer having a refractive index lower than a refractive index of the at least one core, and
the inner cladding layer is enclosed with a trench layer having a refractive index lower than the refractive index of the inner cladding layer and a refractive index of the cladding.

3. The multicore fiber according to claim 2, wherein the core that is enclosed with the inner cladding layer and the trench layer and a core that is not enclosed with the inner cladding layer or the trench layer are alternately disposed along a core disposition in which a core-to-core distance between cores adjacent to each other is almost the same.

4. The multicore fiber according to claim 1, wherein a core-to-core distance between cores adjacent to each other on the line orthogonal to the plane is greater than a core-to-core distance in the first plurality of the cores and a core-to-core distance in the second plurality of the cores.

5. The multicore fiber according to claim 1, wherein a core-to-core distance between cores adjacent to each other on the line orthogonal to the plane is smaller than a core-to-core distance in the first plurality of the cores and a core-to-core distance in the second plurality of the cores.

6. The multicore fiber according to claim 1, wherein a third core-to-core distance between a third pair of adjacent cores in the first row is equal to a fourth core-to-core distance between a fourth pair of adjacent cores in the second row, wherein the third pair is different from the first pair and the fourth pair is different from the second pair.

7. The multicore fiber according to claim 1, wherein the second core-to-core distance is different from the fourth core-to-core distance in the second row.

8. The multicore fiber according to claim 1, wherein the cladding has a substantially circular outer shape in cross-section.

\* \* \* \* \*